United States Patent
Hall et al.

(10) Patent No.: US 8,322,522 B2
(45) Date of Patent: Dec. 4, 2012

(54) NESTED END LINK AND MULTI-LINK CONVEYOR CHAIN

(75) Inventors: William Carleton Hall, Gastonia, NC (US); Charles Stone Stalvey, Mt. Holly, NC (US); Thomas Gerald Knolles, Jr., Huntersville, NC (US)

(73) Assignee: Ramsey Products Corporation, Charlotte, NC (US)

( * ) Notice: Subject to any disclaimer, the term of this patent is extended or adjusted under 35 U.S.C. 154(b) by 209 days.

(21) Appl. No.: 12/728,599

(22) Filed: Mar. 22, 2010

(65) Prior Publication Data

US 2011/0226593 A1 Sep. 22, 2011

(51) Int. Cl.
*B65G 17/06* (2006.01)
*B65G 17/30* (2006.01)

(52) U.S. Cl. .................................. 198/851; 198/853

(58) Field of Classification Search .................. None
See application file for complete search history.

(56) References Cited

U.S. PATENT DOCUMENTS

| | | | |
|---|---|---|---|
| 3,680,927 A | 8/1972 | Neureuther |
| 4,266,656 A | 5/1981 | Richard |
| 4,266,661 A | 5/1981 | Andersson |
| 4,505,383 A | 3/1985 | Wheeldon et al. |
| 4,755,163 A | 7/1988 | Kanehira et al. |
| 4,951,457 A | 8/1990 | Deal |
| 5,042,244 A | 8/1991 | Worsley |
| 5,435,435 A | 7/1995 | Chiba et al. |
| 5,586,644 A | 12/1996 | Coen et al. |
| 5,678,683 A | 10/1997 | Stebnicki et al. |
| 5,779,583 A | 7/1998 | Nakatani et al. |
| 5,884,369 A | 3/1999 | Schick et al. |
| 5,957,268 A | 9/1999 | Meulenkamp |
| 6,196,379 B1 | 3/2001 | Van Esch et al. |
| 6,196,380 B1 | 3/2001 | Teuber et al. |
| 6,213,292 B1 | 4/2001 | Takahashi et al. |
| 6,247,582 B1 | 6/2001 | Stebnicki et al. |
| 6,308,825 B1 | 10/2001 | Nakamura |

(Continued)

FOREIGN PATENT DOCUMENTS

DE 102006044371 A1 4/2007

(Continued)

OTHER PUBLICATIONS

Uni chains 2008,Plastic Modular BELT Catalog, Ammeraal Beltech Modular A/S.

*Primary Examiner* — Kavel Singh
(74) *Attorney, Agent, or Firm* — Shumaker, Loop & Kendrick, LLP (57) ABSTRACT

A nested end protector link for capturing first and second elongate link pins of a multi-link conveyor chain that includes a first link segment having an outer wall in a first vertical plane defining a protective bearing surface having a forward-facing convex face, and a rearward-facing concave face and a first pin access bore extending perpendicularly through the link between the forward-facing convex face and the rearward-facing concave face. A second link segment is integrally-formed with the first link segment and has an outer wall in a second vertical plane defining a protective bearing surface having a forward-facing concave face. A rearward-facing convex face is provided and has a second pin access bore extending perpendicularly through the link between the forward-facing concave face and the rearward-facing convex face.

7 Claims, 7 Drawing Sheets

U.S. PATENT DOCUMENTS

| | | |
|---|---|---|
| 6,382,405 B1 | 5/2002 | Palmaer |
| 6,662,545 B1 | 12/2003 | Yoshida |
| 6,763,936 B2 | 7/2004 | Marsetti et al. |
| 6,779,653 B2 | 8/2004 | Garbagnati |
| 6,854,590 B2 * | 2/2005 | Rudy et al. ............... 198/690.2 |
| 6,952,916 B1 * | 10/2005 | Fountaine ..................... 59/78.1 |
| 6,981,584 B2 | 1/2006 | Grabmann |
| 7,044,290 B2 | 5/2006 | Garbagnati et al. |
| 7,600,632 B2 | 10/2009 | Hall |
| 7,658,277 B2 | 2/2010 | Meulenkamp |
| 7,674,199 B2 | 3/2010 | Golden et al. |
| 2003/0116409 A1 | 6/2003 | Marsetti et al. |
| 2003/0168322 A1 | 9/2003 | Damkjaer |
| 2006/0054472 A1 | 3/2006 | Hall |
| 2008/0017482 A1 | 1/2008 | Fandella |
| 2009/0242360 A1 | 10/2009 | Hall |
| 2009/0277758 A1 | 11/2009 | Marshall |

FOREIGN PATENT DOCUMENTS

| | | |
|---|---|---|
| EP | 1445216 A2 | 8/2004 |
| EP | 1655242 A1 | 5/2006 |
| GB | 2309062 A | 7/1997 |
| WO | WO 2004 041685 A2 | 5/2004 |
| WO | WO 2006 014910 A2 | 2/2006 |
| WO | 2007124749 A2 | 11/2007 |

\* cited by examiner

Fig. 1

Prior Art

NESTED END LINK AND MULTI-LINK CONVEYOR CHAIN

TECHNICAL FIELD AND BACKGROUND OF THE INVENTION

This application relates to a end protector link for multi-link conveyor chains, such as silent or inverted tooth chains. Such chains are frequently used in transporting and conveying materials either as a conveying surface or as the means for moving other containers in which a conveyed material is placed. In such applications, the chain is frequently operated in a path that is bounded by lateral guides, wear strips, or other objects located on either or both sides of the chain. As the chain moves along this path, the ends of the pins projecting from the sides of the chain and the link on the outermost extremity of the chain may rub against the lateral guides, wear strips, or other objects. Eventually this rubbing action will abrade or damage the heads on the ends of these pins. Such wear may also damage links at the outermost extremity of the chain. If the damage or wear to pin heads or links is sufficient the pins and/or links may come out of the chain assembly, effectively destroying the integrity of the chain and damaging the conveying system.

Prior art practices for preventing this problem include providing an end link that has a pair of bores through which the pins extend. The outer facing side of the link is provided with an enlarged counterbore or countersunk segment in which the heads of the respective pins reside. The holes are large enough and deep enough that the heads are recessed below the surface of the link and are thus not directly engaged by any adjacent wear or guide surfaces. However, prior art end links with the above features, such as countersunk pin bores, are shaped so that gaps exist between adjacent links. These gaps can cause the chain to catch against the wear or guide surfaces, particularly if the wear strip segments are misaligned, worn or themselves have gaps between adjacent wear segments. Gaps between adjacent end links can also cause damage to items being conveyed on the conveyor, such as small bottles or objects with small parts that can slide into the gap between wear strips when the gap is at its widest.

SUMMARY OF THE INVENTION

Therefore, it is an object of the invention to provide an end protector link that prevents abrasion and damage to the heads of link pins of conveyor chains.

It is another object of the invention to provide an end protector link that provides a smooth, protective wear surface presented to wear strips, guides and the like against which the conveyor chain passes.

It is another object of the invention to provide an end protector link that acts to preserve the structural integrity of the chain.

It is another object of the invention to provide an end protector link is shaped whereby adjacent links are nested with each other and reduce the size of gaps between them.

It is another object of the invention to provide an end protector link that can be used on a single or both sides of a conveyor.

It is another object of the invention to provide an end protector link wherein the top and bottom of the links is a mirror image of each other so that the same link can be used on both sides of a conveyor.

These and other aspects of the invention are illustrated by way of example by providing a nested end protector link for capturing first and second elongate link pins of a multi-link conveyor chain that includes a first link segment having an outer wall in a first vertical plane defining a protective bearing surface having a forward-facing convex face, and a rearward-facing concave face and a first pin access bore extending perpendicularly through the link between the forward-facing convex face and the rearward-facing concave face. A second link segment is integrally-formed with the first link segment and has an outer wall in a second vertical plane defining a protective bearing surface having a forward-facing concave face. A rearward-facing convex face is provided and has a second pin access bore extending perpendicularly through the link between the forward-facing concave face and the rearward-facing convex face. The forward-facing convex face of the first link segment and the forward-facing concave face of the second link segment have respective complementary arcuate shapes adapted to nest with and move relative to a respective rearward-facing concave face and rearward-facing convex face of a like end protector link forward of the end protector link to which the end protector link is nested in the conveyor chain. The rearward-facing convex face of the second link segment and the rearward-facing concave face segment of the first link segment have respective complementary arcuate shapes adapted to nest with and move relative to a respective forward-facing concave face and forward-facing convex face of a like end protector link rearward of the end protector link to which the end protector link is nested in the conveyor chain.

According to one aspect of the invention, the first the second link segments are mirror images of each other on either side of a notional longitudinal axis bisecting the first and second pin access bores.

According to another aspect of the invention, the end protector link is metal.

According to another aspect of the invention, the concave and convex faces of the first and second end protector link segments are annular.

According to another aspect of the invention, the concave and convex faces of the first and second end protector link segments are annular and define respective radii.

According to another aspect of the invention, the first and second pin access bores include countersunk portions for receiving enlarged heads of the link pins.

According to another aspect of the invention, the first the second link segments are mirror images of each other on either side of a notional lateral axis bisecting a longitudinal axis of the end protector link.

According to another aspect of the invention, a multi-link conveyor chain is provided, having a plurality of conveyor links interconnected in a lengthwise direction and a widthwise direction by a plurality of laterally-extending pairs of link pins positioned in respective pairs of bores therethrough to form a conveyor having a horizontal supporting surface for transporting successive items downstream in a processing line by engagement with a driving element. A plurality of end protector links are provided for capturing and retaining the plurality of link pins and for being engaged by wearing surfaces past which the conveyor moves and protecting enlarged heads of the link pins to exposure to said wearing surfaces. The nested end protector links each include a first link segment having an outer wall in a first vertical plane defining a protective bearing surface having a forward-facing convex face and a rearward-facing concave face and a first pin access bore extending perpendicularly through the link between the forward-facing convex face and the rearward-facing concave face. A second link segment is integrally-formed with the first link segment and has an outer wall in a second vertical plane defining a protective bearing surface having a forward-facing concave face, a rearward-facing convex face and a second pin access bore extending perpendicularly through the link between the forward-facing convex face and the rearward-facing concave face. The forward-facing convex face of the first link segment and the forward-facing concave face of the second link segment have respective complementary arcuate shapes adapted to nest with and move relative to a respective rearward-facing concave face and rearward-facing convex face of a like end protector link forward of the end protector link to which the end protector link is nested in the conveyor chain. The rearward-facing convex face of the second link segment and the rearward-facing concave face segment of the first link segment have respective complementary arcuate shapes adapted to nest with and move relative to a respective forward-facing concave face and forward-facing convex face of a like end protector link rearward of the end protector link to which the end protector link is nested in the conveyor chain. The enlarged heads of the link pins extend through and are captured in respective ones of the first and second link pin access bores.

According to another aspect of the invention, the first the second link segments are mirror images of each other on either side of a notional longitudinal axis bisecting the first and second pin access bores.

According to another aspect of the invention, the chain includes a second plurality of end protector links positioned on a side of the conveyor chain laterally opposed to the plurality of end protector links for protecting enlarged heads of the link pins to exposure to wearing surfaces on the side of the plurality of end protector links.

BRIEF DESCRIPTION OF THE DRAWINGS

Some of the aspects of the invention have been set forth above. Other aspects and advantages of the invention will appear as the description of the invention proceeds when taken in conjunction with the following drawings, in which.

DESCRIPTION OF THE PREFERRED EMBODIMENTS AND BEST MODE

Figure 1:
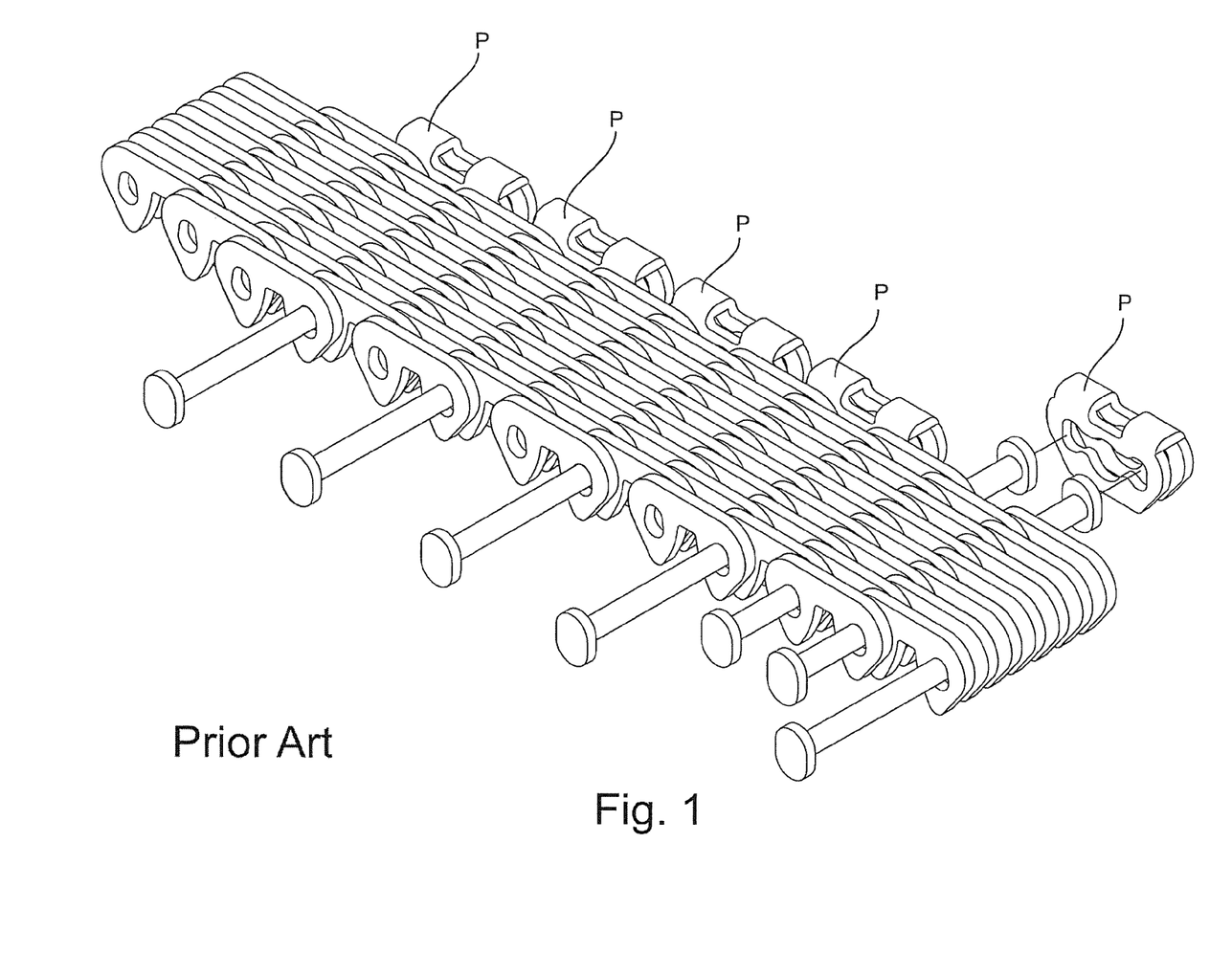
FIG. 1 is a view of a conveyor chain with prior art end link protectors.

Referring now specifically to the drawings, a prior art end protector links in place on a conveyor chain is shown generally in FIG. 1 at reference letters "P". As is generally shown, the links "P" are longitudinally spaced-apart from each other and have significant gaps between adjacent links that became progressively larger towards the top of the conveyor where objects being carried by the conveyor may become lodged in a gap. Likewise, these gaps are subject to catch on misaligned wear strips or guides and cause damage to the conveyor chain and/or the wear strips or guides.

Figure 2:
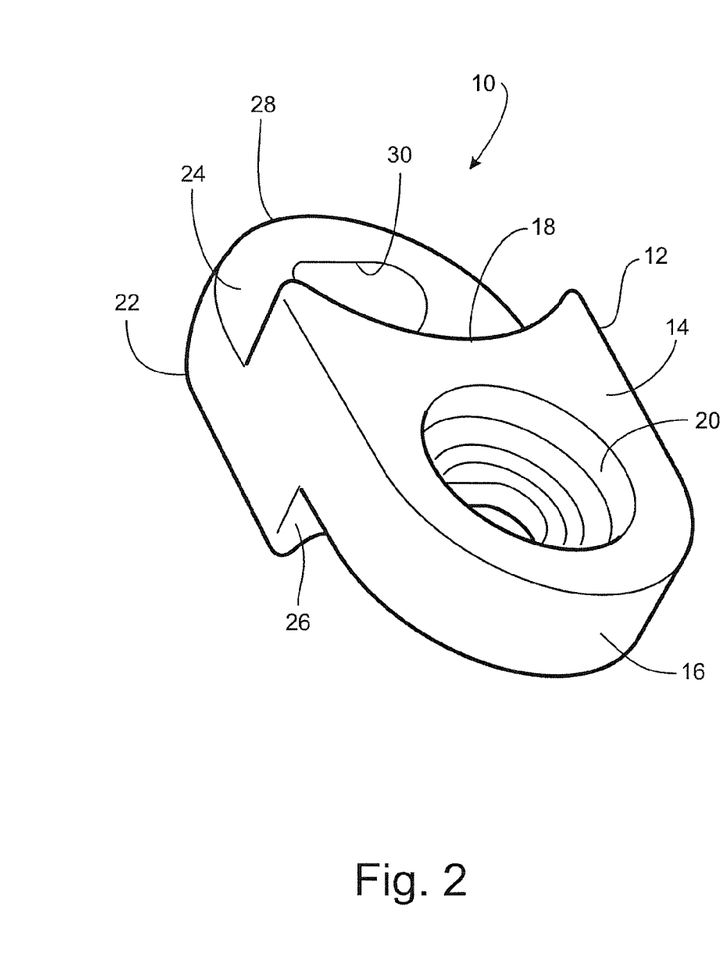
FIGS. 2 and 3 are enlarged perspective views of a single end protector link according to one illustrative embodiment of the invention.
Figure 3:
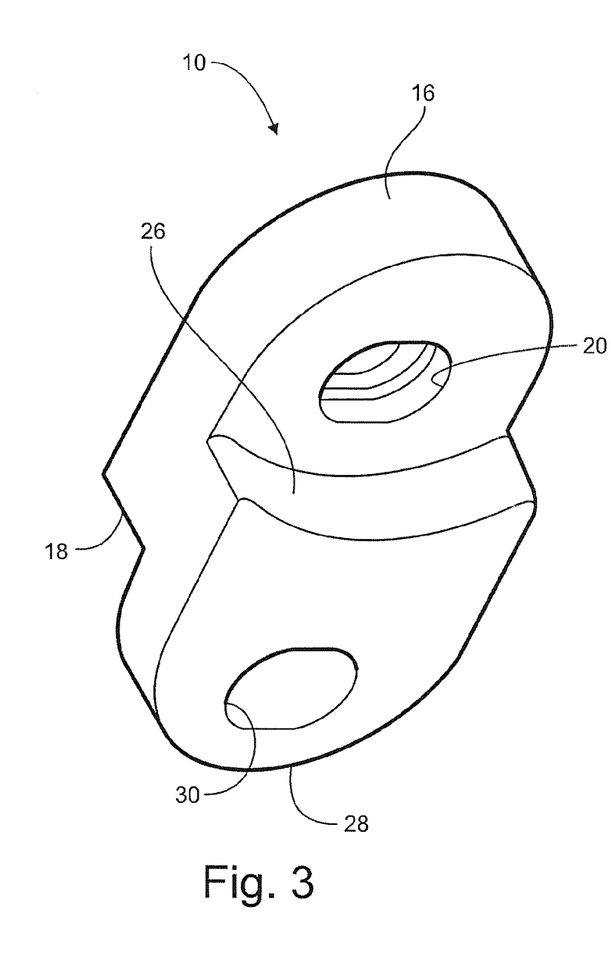
Figure 4:
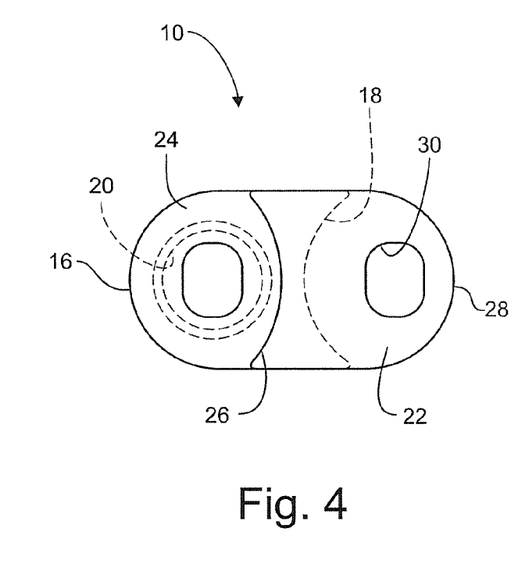
FIGS. 4-7 are second side, front elevation, first side and top side views of the end protector link shown in FIGS. 2 and 3.
Figure 5:
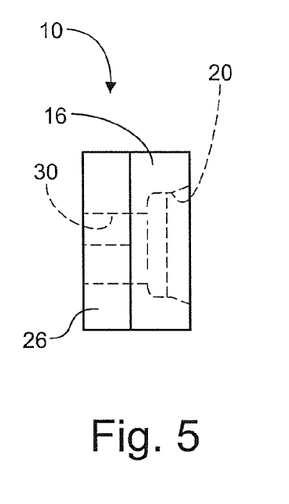
Figure 6:
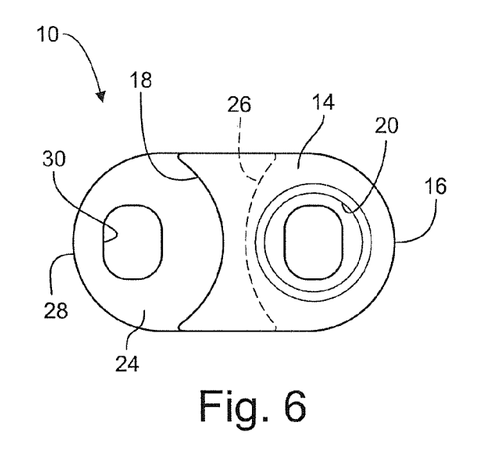
Figure 7:
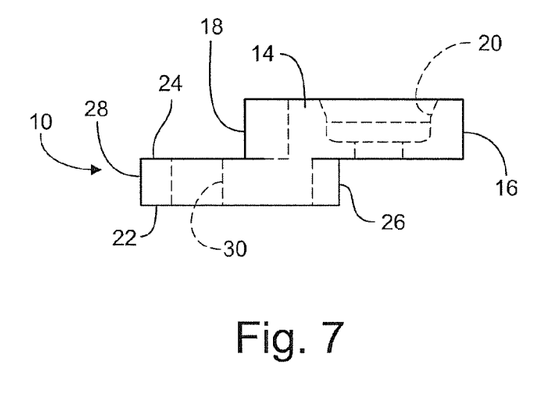

FIGS. 2 and 3 illustrate a single end protector link 10 according to one illustrative embodiment of the invention. The link 10 includes a first link segment 12 having an outer wall 14 in a first vertical plane defining a protective bearing surface having a forward-facing convex face 16, and a rearward-facing concave face 18 and a first, countersunk, pin access bore 20 extending perpendicularly through the link 10 between the forward-facing convex face 16 and the rearward-facing concave face 18. Each pin access bore 20 can be circular or non-circular. A second link segment 22 is integrally-formed with the first link segment 10 and has an outer wall 24 in a second vertical plane defining a protective bearing surface having a forward-facing concave face 26. A rearward-facing convex face 28 is provided and has a second pin access bore 30 extending perpendicularly through the link 10 between the forward-facing convex face 26 and the rearward-facing convex face 28. Each pin access bore 30 can be circular or non-circular. The forward-facing convex face 16 of the first link segment and the forward-facing concave face 26 of the second link segment 22 have respective complementary arcuate shapes adapted to nest with and move relative to a respective rearward-facing concave face 18 and rearward-facing convex face 28 of a like end protector link 10 forward of the end protector link 10 to which the end protector link 10 is nested in the conveyor chain. The rearward-facing convex face 28 of the second link segment 22 and the rearward-facing concave face 18 of the first link segment 12 have respective complementary arcuate shapes adapted to nest with and move relative to a respective forward-facing concave face 26 and forward-facing convex face 16 of a like end protector link 10 rearward of the end protector link 10 to which the end protector link is nested in the conveyor chain. See, also, FIGS. 4-7. Links 10 are preferably cast of durable, wear-resistant metal, but can be formed by other processes and of other materials, such as plastics and resin-based products suitable for use in environments subject to wear.

Figure 8:
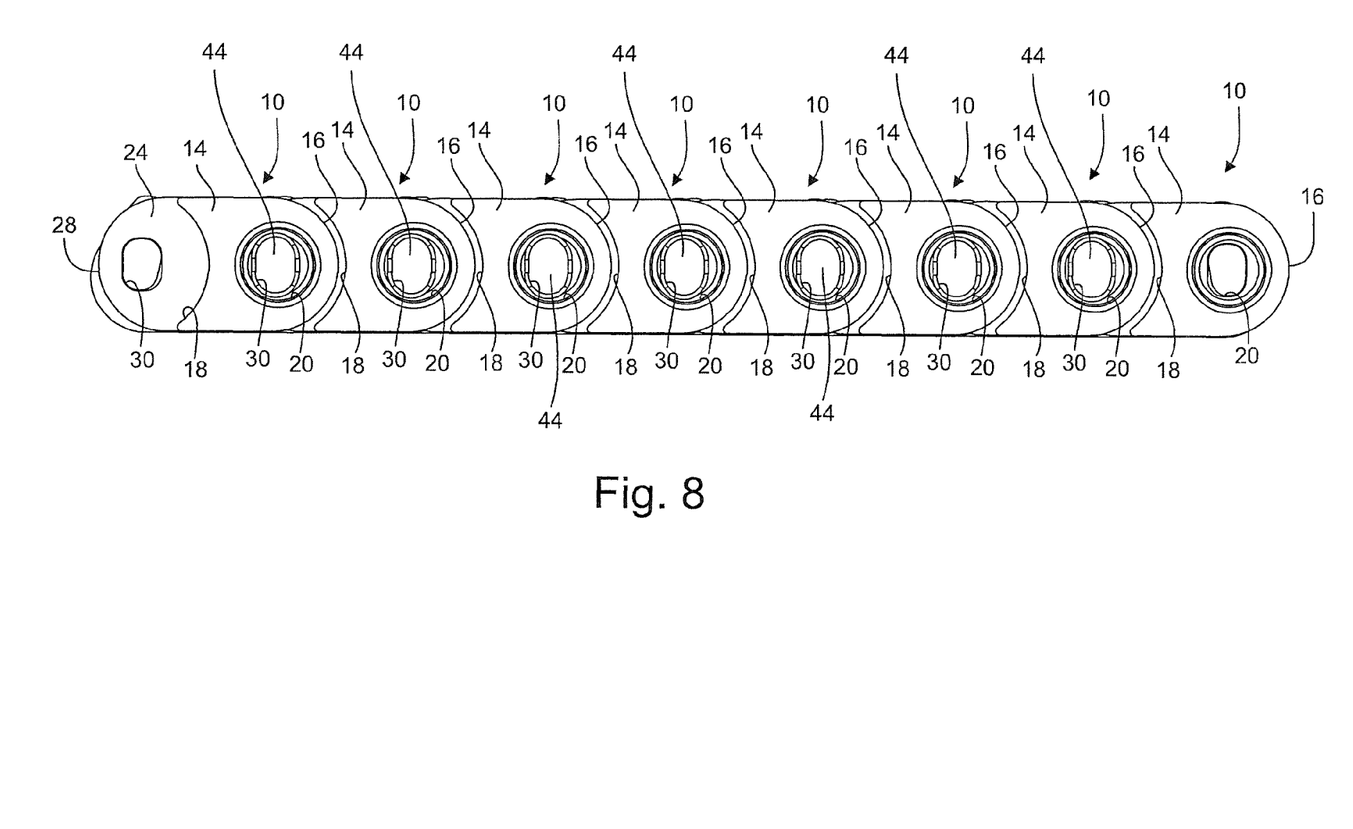
FIG. 8 is a side elevation of a length of nested end protector links according to FIGS. 2 and 3.

FIG. 8 illustrates the manner in which a plurality of end protector links 10 can be nested together whereby adjacent faces 26, 28 and 16, 18 of adjacent links 10 are nested together. Because of the overlap and offset spacing of the adjacent links 10, no single gap extends completely across the width of the end links 10. As noted above, chains such as chain 49 are frequently used in the transport and conveying of materials either as a conveying surface, or as the means for moving other containers in which a conveyed material is placed. In such applications, the chain is frequently operated in a path that is bounded by lateral guides, wear strips, or other objects located on either or both sides of the chain.

Figure 9:
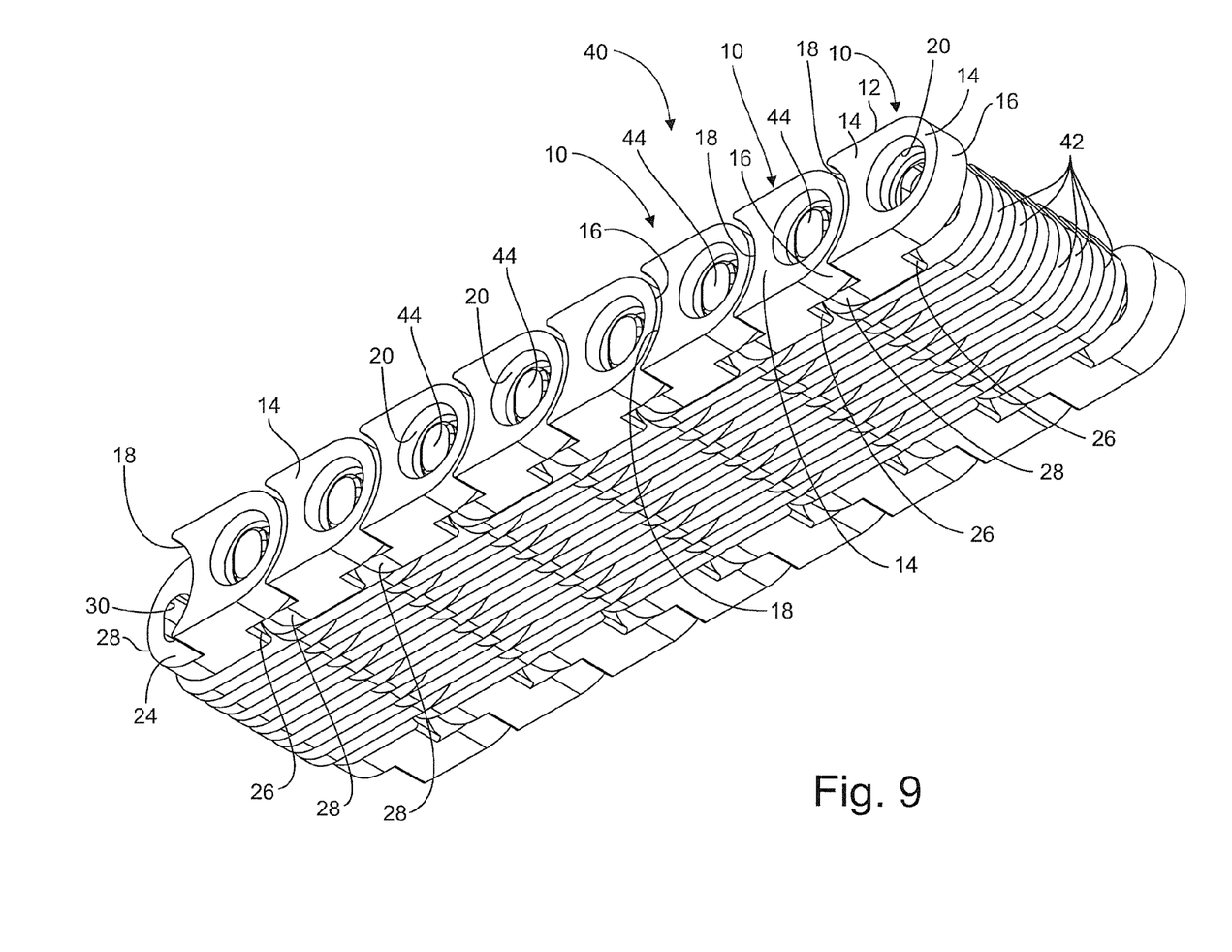
FIG. 9 is a top isometric view of a length of conveyor chain showing nested end protector links according to an illustrative embodiment of the invention on both sides.
Figure 10:
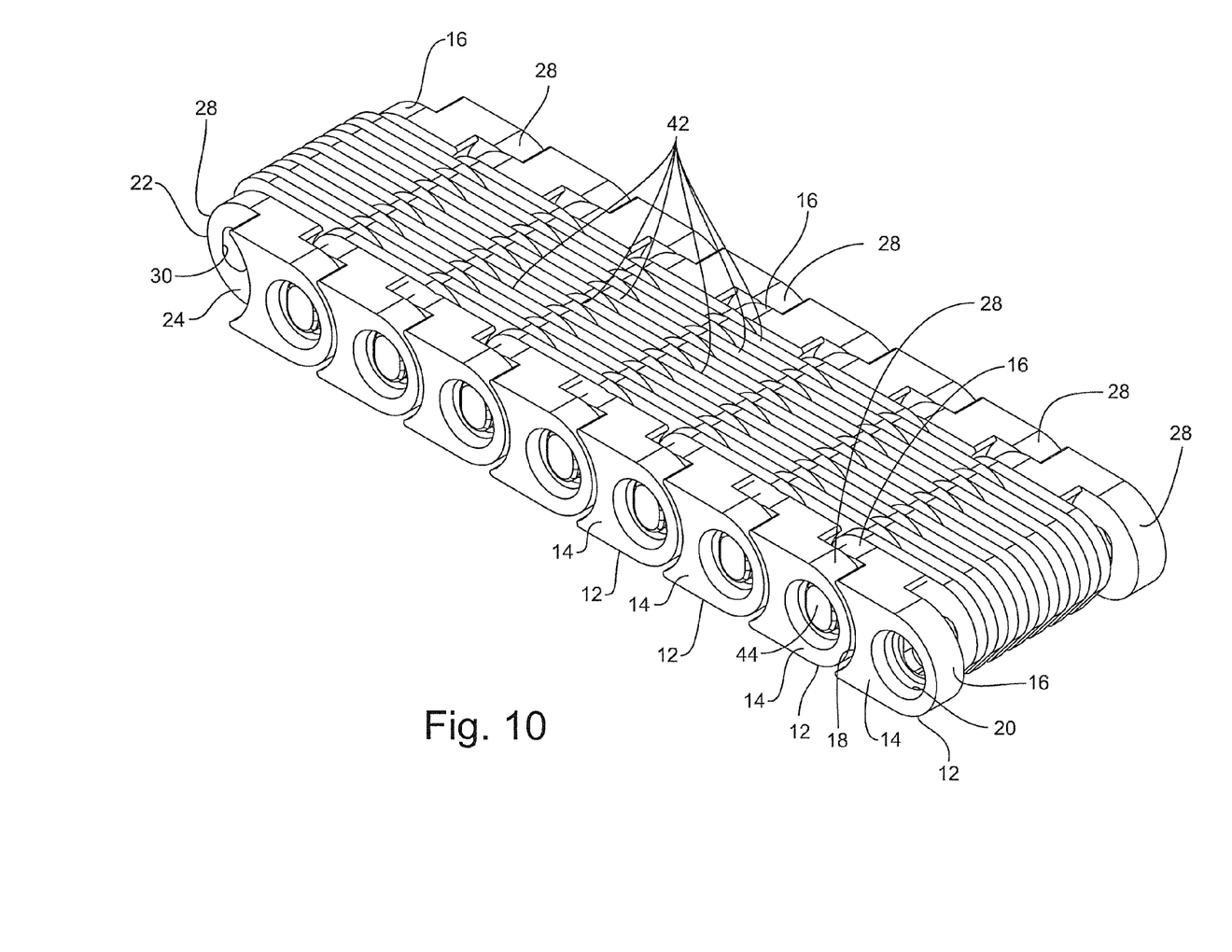
FIG. 10 is another top isometric view of a length of conveyor chain showing nested end protector links according to an illustrative embodiment of the invention on both sides.
Figure 11:
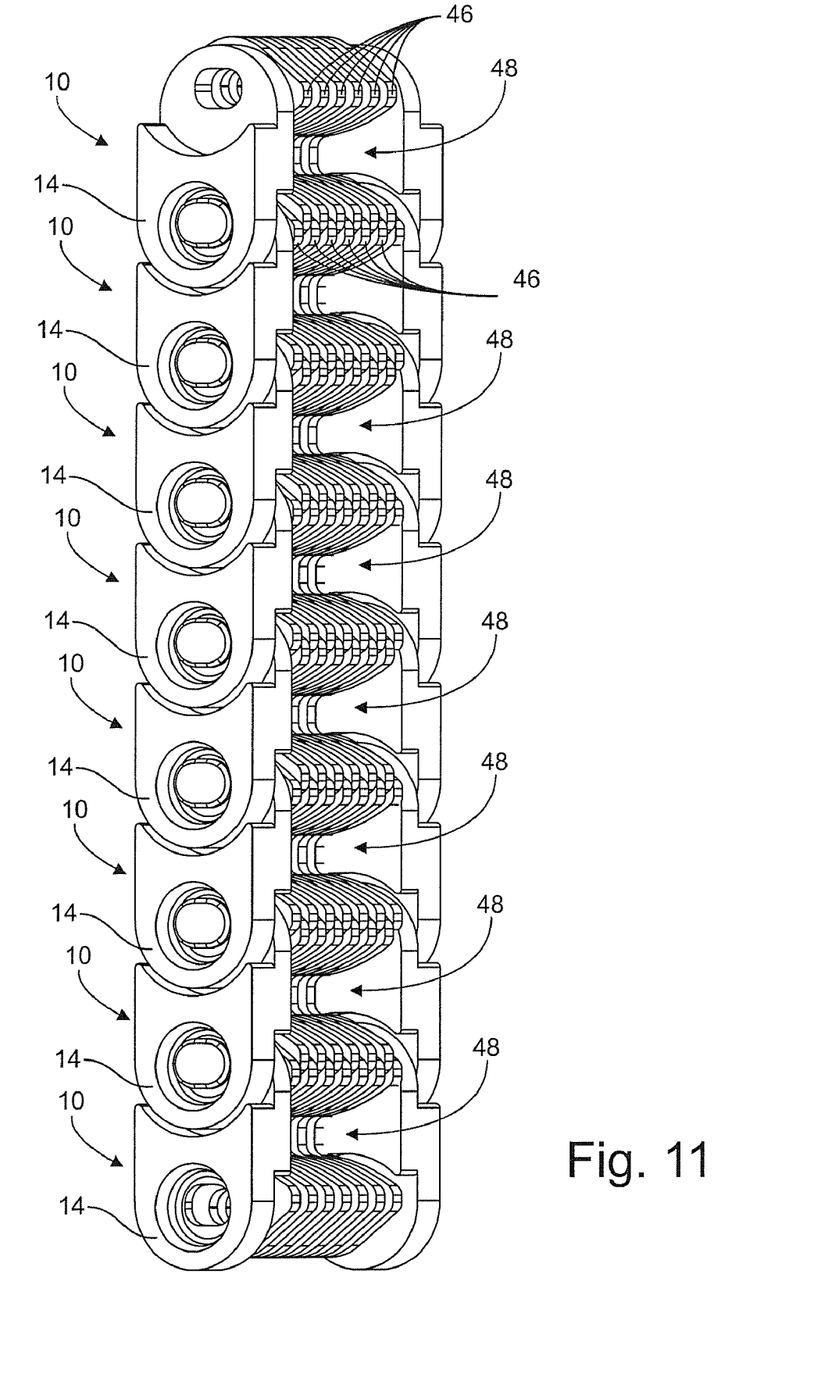
FIG. 11 is a bottom isometric view of a length of conveyor chain showing tooth-shaped bottom sides of the links in the chain.

As shown in FIGS. 9-11, an assembled chain 40 includes chain links 42 assembled and held in place by pins 44. According to one preferred embodiment of the invention, the top half and bottom half of the links 10 are mirror images of each other on either side of a notional longitudinal axis bisecting the first and second pin access bores 20 and 30. This symmetrical design allows a single link design to be used on both sides of the chain 40 and avoids the need to design and manufacture lefthand and right-hand versions, while nevertheless maintaining the same link orientation on both sides of the chain 40. The inner surfaces of the links 10 are also suitable for retaining and guiding the chain on the drive sprockets in the absence of another form of drive mechanism. While symmetrical links 10 are considered preferable to asymmetrical designs, links according to the invention can be either symmetrical or asymmetrical, and either may present advantages in particular situations. As shown in FIG. 11, the bottom sides of the chain links 42 have downwardly extending tooth-shaped extensions 46 and channels 48 formed between rows of the extensions 46.

A nested end protector link and conveyor chain with nested end protector links is described above. Various details of the invention may be changed without departing from the scope of the invention. Furthermore, the foregoing description of the preferred embodiment of the invention and best mode for practicing the invention are provided for the purpose of illustration only and not for the purpose of limitation.

We claim:

1. A multi-link conveyor chain, comprising:
   (a) a plurality of conveyor links interconnected in a lengthwise direction and a widthwise direction by a plurality of laterally-extending pairs of link pins positioned in respective pairs of bores therethrough to form a conveyor having a horizontal supporting surface for transporting successive items downstream in a processing line by engagement with a driving element;
   (b) a plurality of end protector links for capturing and retaining the plurality of link pins and for being engaged by wearing surfaces past which the conveyor moves and protecting enlarged heads of the link pins to exposure to said wearing surfaces, comprising:
      (i) a first link segment having an outer wall in a first vertical plane defining a protective bearing surface having a forward-facing convex face, a rearward-facing concave face and a first pin access bore extending perpendicularly through the link between the forward-facing convex face and the rearward-facing concave face;
      (ii) a second link segment integrally-formed with the first link segment and having an outer wall in a second vertical plane having a forward-facing concave face, a rearward-facing convex face and a second pin access bore extending perpendicularly through the link between the forward-facing concave face and the rearward-facing convex face;
      (iii) the forward-facing convex face of the first link segment and the forward-facing concave face of the second link segment having respective complementary arcuate shapes adapted to nest with and move relative to a respective rearward-facing concave face and rearward-facing convex face of a like end protector link forward of the end protector link to which the end protector link is nested in the conveyor chain;
      (iv) the rearward-facing convex face of the second link segment and the rearward-facing concave face of the first link segment having respective complementary arcuate shapes adapted to nest with and move relative to a respective forward-facing concave face and forward-facing convex face of a like end protector link rearward of the end protector link to which the end protector link is nested in the conveyor chain, a top half and bottom half of the end protector link being mirror images of each other on either side of a notional longitudinal axis bisecting the first and second access bores, wherein the end protector link may be utilized on opposite side edges of the conveyor chain by rotating the end protector link 180 degrees about the notional longitudinal axis bisecting the first and second pin access bores while maintaining the forward-facing convex face in its forward-facing orientation; and
   (c) the enlarged heads of the link pins extending through and captured in respective ones of the first and second link pin access bores.

2. A multi-link conveyor chain according to claim 1, wherein the end protector link is metal.

3. A multi-link conveyor chain according to claim 1, wherein the concave and convex faces of the first and second end protector link segments are annular.

4. A multi-link conveyor chain according to claim 1, wherein the concave and convex faces of the first and second end protector link segments are annular and define respective radii.

5. A multi-link conveyor chain according to claim 1, wherein the first and second pin access bores include countersunk portions for receiving the enlarged heads of the link pins.

6. A multi-link conveyor chain according to claim 1, wherein the first and the second link segments are mirror images of each other on either side of a notional lateral axis bisecting a longitudinal axis of the end protector link.

7. A multi-link conveyor chain according to claim 1, and including a second plurality of end protector links according to subparagraphs (b) and (c) positioned on a side of the conveyor chain laterally opposed to the plurality of end protector links for protecting enlarged heads of the link pins to exposure to wearing surfaces on the side of the plurality of end protector links.

* * * * *